US012706756B2

(12) United States Patent
Wright et al.

(10) Patent No.: US 12,706,756 B2
(45) Date of Patent: Aug. 11, 2026

(54) COMPUTER-IMPLEMENTED SYSTEM AND METHOD INCLUDING PUBLIC KEY COMBINATION VERIFICATION

(71) Applicant: nChain Licensing AG, Zug (CH)

(72) Inventors: Craig Steven Wright, London (GB); Owen Vaughan, London (GB)

(73) Assignee: NCHAIN LICENSING AG, Zug (CH)

( * ) Notice: Subject to any disclaimer, the term of this patent is extended or adjusted under 35 U.S.C. 154(b) by 132 days.

(21) Appl. No.: 18/905,703

(22) Filed: Oct. 3, 2024

(65) Prior Publication Data

US 2025/0106042 A1 Mar. 27, 2025

Related U.S. Application Data

(63) Continuation of application No. 17/285,856, filed as application No. PCT/IB2019/058580 on Oct. 9, 2019, now Pat. No. 12,149,636.

(30) Foreign Application Priority Data

Oct. 17, 2018 (GB) ..................................... 1816936

(51) Int. Cl.

| | |
|---|---|
| ***H04L 9/14*** | (2006.01) |
| ***H04L 9/30*** | (2006.01) |
| ***H04L 9/32*** | (2006.01) |
| *H04L 9/00* | (2022.01) |

(52) U.S. Cl.

CPC .............. *H04L 9/3255* (2013.01); *H04L 9/14* (2013.01); *H04L 9/30* (2013.01); *H04L 9/50* (2022.05)

(58) Field of Classification Search

CPC . H04L 9/3255; H04L 9/14; H04L 9/30; H04L 9/50

See application file for complete search history.

(56) References Cited

U.S. PATENT DOCUMENTS

| | | | | |
|---|---|---|---|---|
| 10,289,816 | B1 * | 5/2019 | Malassenet | G06F 9/45516 |
| 10,320,569 | B1 * | 6/2019 | Wentz | H04L 9/3239 |
| 12,149,636 | B2 * | 11/2024 | Wright | G06F 21/64 |
| 2018/0136633 | A1 * | 5/2018 | Small | G06Q 20/4014 |
| 2018/0146035 | A1 * | 5/2018 | Williams | H04L 9/3255 |

FOREIGN PATENT DOCUMENTS

| | | | |
|---|---|---|---|
| WO | 2017192837 | A1 | 11/2017 |
| WO | 2018121834 | A1 | 7/2018 |

* cited by examiner

*Primary Examiner* — Lynn D Feild
*Assistant Examiner* — Vladimir I Gavrilenko
(74) *Attorney, Agent, or Firm* — Tarolli, Sundheim, Covell & Tummino LLP

(57) ABSTRACT

A computer-implemented method is disclosed. The method includes providing a blockchain transaction comprising a public key combination verification function. The blockchain transaction is configured to be redeemable to permit access to, or transfer control of, a resource by providing to the blockchain transaction an input comprising: a plurality of public keys; a gradient value (λ) related to two of the plurality of public keys; and a group public key derived from a combination of the public keys and the gradient value (λ). The blockchain transaction is configured to apply the public key verification function to the input to verify, upon successful redemption of the transaction, that the group public key is derived from the combination of the plurality of public keys.

20 Claims, 3 Drawing Sheets

Table 1: Public Key Data Encoding

| Data Structure | Length in Bytes | Data |
|---|---|---|
| Uncompressed key flag | 1 | 04 |
| X | 32 | F028892BAD7ED57D2FB57BF33081D5CFCF6F9ED3D3D7F159C2E2FFF579DC341A |
| Y | 32 | 07CF33DA18BD734C600896A72BBC4749D5141C90EC8AC328AE52DDFE2E505BDB |

Figure 1

| Table 1: Public Key Data Encoding | | |
|---|---|---|
| Data structure | Length in bytes | Data |
| Uncompressed key flag | 1 | 04 |
| X | 32 | F028892BAD7ED57D2FB57BF33081D5CFCF6F9ED3D3D7F159C2E2FFF579DC341A |
| Y | 32 | 07CF33DA18BD734C600B96A72BBC4749D5141C90EC8AC328AE52DDFE2E505BDB |

Figure 2

| Table 2: Check $\lambda$ when $P_1 \neq P_2$ | | |
|---|---|---|
| Stack | Script | Description |
| | $<y_2> <y_1> <\lambda> <x_2> <x_1>$ OP_SUB OP_MUL $<p>$ OP_MOD OP_3 OP_ROLL OP_3 OP_SUB $<p>$ OP_MOD OP_EQUAL | |
| $<y_2> <y_1> <\lambda> <x_2> <x_1>$ | OP_SUB OP_MUL $<p>$ OP_MOD OP_3 OP_ ROLL OP_3 OP_SUB $<p>$ OP_MOD OP_EQUAL | Constants added to the stack |
| $<y_2> <y_1> <\lambda> <x_2 - x_1>$ | OP_MUL $<p>$ OP_MOD OP_3 OP_ ROLL OP_3 OP_SUB $<p>$ OP_MOD OP_EQUAL | Subtract |
| $<y_2> <y_1> <\lambda(x_2 - x_1)>$ | $<p>$ OP_MOD OP_3 OP_ ROLL OP_3 OP_SUB $<p>$ OP_MOD OP_EQUAL | Multiply |
| $<y_2> <y_1> <\lambda(x_2 - x_1)> <p>$ | OP_MOD OP_3 OP_ ROLL OP_3 OP_SUB $<p>$ OP_MOD OP_EQUAL | Constant added to the stack |
| $<y_2> <y_1> <\lambda(x_2 - x_1) \bmod p>$ | OP_3 OP_ ROLL OP_3 OP_PICK OP_SUB $<p>$ OP_MOD OP_EQUAL | Mod |
| $<y_1> <\lambda(x_2 - x_1) \bmod p> <y_2>$ | OP_3 OP_ ROLL OP_SUB $<p>$ OP_MOD OP_EQUAL | Roll 3rd item of stack |
| $<\lambda(x_2 - x_1) \bmod p> <y_2> <y_1>$ | OP_SUB $<p>$ OP_MOD OP_EQUAL | Roll 3rd item of stack |
| $<\lambda(x_2 - x_1) \bmod p> <y_2 - y_1>$ | $<p>$ OP_MOD OP_EQUAL | Subtract |
| $<\lambda(x_2 - x_1) \bmod p> <y_2 - y_1> <p>$ | OP_MOD OP_EQUAL | Constant added to the stack |
| $<\lambda(x_2 - x_1) \bmod p> <y_2 - y_1 \bmod p>$ | OP_EQUAL | Mod |
| TRUE | | Check equal |

Figure 3

| Table 3: Check $x$ coordinate of $P_3$ | | |
|---|---|---|
| Stack | Script | Description |
| | $<x_3> <\lambda> <x_1> <x_2>$ OP_3 OP_ ROLL OP_DUP OP_MUL OP_SWAP OP_SUB OP_SWAP $<p>$ OP_MOD OP_EQUAL | |
| $<x_3> <\lambda> <x_1> <x_2>$ | OP_3 OP_ ROLL OP_DUP OP_MUL OP_SWAP OP_SUB OP_SWAP $<p>$ OP_MOD OP_EQUAL | Constants pushed to stack |
| $<x_3> <x_1> <x_2> <\lambda>$ | OP_DUP OP_MUL OP_SWAP OP_SUB OP_SWAP $<p>$ OP_MOD OP_EQUAL | Roll 3rd item |
| $<x_3> <x_1> <x_2> <\lambda> <\lambda>$ | OP_MUL OP_SWAP OP_SUB OP_SWAP $<p>$ OP_MOD OP_EQUAL | Duplicate |
| $<x_3> <x_1> <\lambda^2> <x_2>$ | OP_SWAP OP_SUB OP_SWAP $<p>$ OP_MOD OP_EQUAL | Multiply |
| $<x_3> <x_1> <\lambda^2 - x_2>$ | OP_SUB OP_SWAP $<p>$ OP_MOD OP_EQUAL | Swap |
| $<x_3> <\lambda^2 - x_2> <x_1>$ | OP_SWAP $<p>$ OP_MOD OP_EQUAL | Subtract |
| $<x_3> <\lambda^2 - x_2 - x_1>$ | $<p>$ OP_MOD OP_EQUAL | Constant pushed to the stack |
| $<x_3> <\lambda^2 - x_2 - x_1> <p>$ | OP_MOD OP_EQUAL | Mod |
| $<x_3> <\lambda^2 - x_2 - x_1 \bmod p>$ | OP_EQUAL | Swap |
| TRUE | | Check equal |

Figure 4

| Scaling properties | Standard multisig | Individual signatures method | Group signatures method | Group signatures method with key addition |
|---|---|---|---|---|
| Signatures | Linear $M$ | Linear $M$ | Zero | Zero |
| Public keys | Linear $N$ | Linear $M$ | Zero | Linear $M$ |
| Merkle path | N/A | $\text{Log}\binom{N}{M}$ | $\text{Log}\binom{N}{M}$ | $\text{Log}\binom{N}{M}$ |

Redeem script:

```
<Verify Merkle path>
<PointAddMulti P1,P2,…,PM,P>
<CheckSig>
```

Tx2

Input (unlocking script):

```
<Sig P><P>
<Gradients><P><P1><P2>…<PM>
<Merkle path>
```

Figure 6

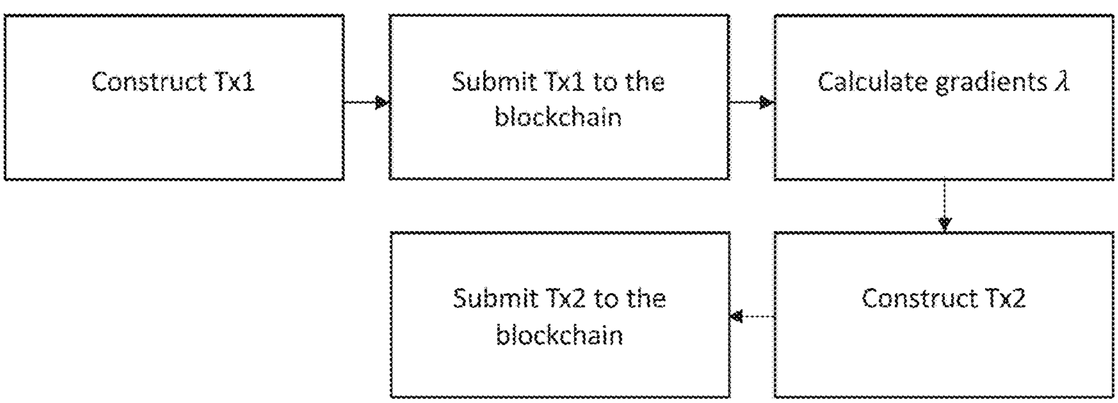

COMPUTER-IMPLEMENTED SYSTEM AND METHOD INCLUDING PUBLIC KEY COMBINATION VERIFICATION

CROSS REFERENCE TO RELATED APPLICATIONS

This application is a continuation of U.S. patent application Ser. No. 17/285,856, filed Apr. 15, 2021, entitled "COMPUTER-IMPLEMENTED SYSTEM AND METHOD INCLUDING PUBLIC KEY COMBINATION VERIFICATION," which is a 371 National Stage of International Patent Application No. PCT/IB2019/058580, filed Oct. 9, 2019, which claims priority to United Kingdom Patent Application No. 1816936.7, filed Oct. 17, 2018, the disclosures of which are incorporated herein by reference in their entirety.

BACKGROUND

This disclosure relates generally to the transfer of resource control and/or access, and more particularly to transfer of such control and/or access using cryptographic multisignature methods on a blockchain. The disclosure is particularly suited, but not limited to, use on the Bitcoin blockchain or any variant of the Bitcoin protocol.

SUMMARY

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions.

Each transaction is a data structure that encodes the transfer of control of a digital asset or resource (e.g. cryptocurrency or tokenised item) between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

Blockchain transactions can make use of built-in multi-signature protocols to restrict transactions such that M of N total signatures need to be presented as input to a redeem script redeem a transaction. For example, a transaction may be locked using a three of five multisignature method such that the transaction may be unlocked only by using three private keys corresponding to any three of the five signatures.

For an M of N method, with reference to the command used in variations of the Bitcoin blockchain protocols, the op code OP_MULTISIG takes as input N public keys and M signatures. The N public keys, in this example, are stored in the redeem script itself. The op code starts with the first signature and searches the N public keys testing to see if the signature was created by that public key. It drops every key for which the signature does not match. For this reason, the order of the signatures must match the order with which the public keys are provided. An example of a multisig redeem script is given below:

| Redeem script |
| --- |
| <PubKey 1><PubKey 2>...<PubKey N> OP_CHECKMULTISIG |

Which, to unlock, would require presentation of the following input:

| Input |
| --- |
| <sig 1><Sig 2>...<Sig M> |

It is evident from the above that the redeem script size scales linearly with both the number of required signatures M and the number of participants N. Therefore, as M and N increase, the number of signatures required in a redeeming transactions to redeem the transaction increases, as does the number of public keys. Consequently, the network speed required to propagate, and space required to store, a subsequent redeeming transaction increases. Further, the number of operations that need to be performed when combining an unlocking script of the redeeming transaction with the redeem script increases linearly in N and in M.

Thus, it is desirable to provide a solution for reducing the operational and storage requirements associated with the transmission, handling, and storage of blockchain transactions, such those blockchain transactions which make use of multisignature protocols, and particularly those transactions which require the storage of large numbers of public keys.

Such an improved solution has now been devised. Thus, in accordance with the present disclosure there is provided a method as defined in the appended claims.

In accordance with the disclosure there is provided a computer-implemented method. It may be described as a security method.

The method may comprise the step of: providing a blockchain transaction comprising a public key combination verification function, the blockchain transaction configured to be redeemable to permit access to or transfer control of a resource by providing to the blockchain transaction an input comprising: a plurality of public keys; at least one gradient value related to a respective two of the plurality of public keys; and a group public key derived from a combination of the plurality of public keys and the at least one gradient value, wherein the blockchain transaction is configured to apply the public key verification function to the input to verify, upon successful redemption of the transaction, that the group public key is derived from the combination of the plurality of public keys.

Such a method provides a way of transferring control or, or access to, a resource represented and/or controlled by a plurality of private keys in a secure, reliable, and publicly verifiable manner.

The method may comprise the steps of: deriving a derived public key from a known value; and arranging the derived public key as a sequence of secondary public keys, wherein the sequence of secondary public keys is a subset of the plurality of public keys.

This enables a user to translate a known requirement of the method into a public key to be used in the method, thereby providing the advantage of improving the versatility of the method. The further advantage is provided that coefficients of the sequence may be calculated in advance, thereby increasing the speed with which the method can be carried out.

The method may comprise the step of applying a restricting function to the known value prior to arranging the derived public key as a sequence of secondary public keys, thereby restricting the size of the subset.

This provides the advantage further increasing the efficiency of the method.

The method may comprise the step of calculating a public key of the plurality based at least in part on a further public key of the plurality and the derived public key.

This provides the advantage of removing the requirement to store a given plurality of public keys given that one or more of the plurality can be derived from one stored public key.

The blockchain transaction may further comprise: a group signature corresponding to the group public key; a Merkle root; and a Merkle path verification function, wherein the blockchain transaction is configured to be redeemable by providing to the blockchain transaction: a Merkle path associated with the plurality of public keys; and a group private key corresponding to the group signature.

Such a method requires fewer processing steps to achieve a given level of security, thereby providing the advantage of increasing the efficiency of the method while maintaining security.

The disclosure also provides a system, comprising: a processor; and memory including executable instructions that, as a result of execution by the processor, causes the system to perform any embodiment of the computer-implemented method described herein.

The disclosure also provides a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF DRAWINGS

These and other aspects of the present disclosure will be apparent from and elucidated with reference to, the embodiment described herein. An embodiment of the present disclosure will now be described, by way of example only, and with reference to the accompany drawings, in which:

FIG. 1 is a table illustrating data encoding for an uncompressed public key;

FIG. 2 is a table showing the evolution of a stack carrying out an embodiment of the present disclosure;

FIG. 3 is a table showing the evolution of a stack carrying out an embodiment of the present disclosure;

FIG. 4 is a table illustrating the relationships between M, N, and script size for different multisignature methods;

FIG. 5 schematically illustrates two transactions embodying the present disclosure;

FIG. 6 is a flow chart showing a sequence of steps embodying the present disclosure.

DETAILED DESCRIPTION

Figure 7:
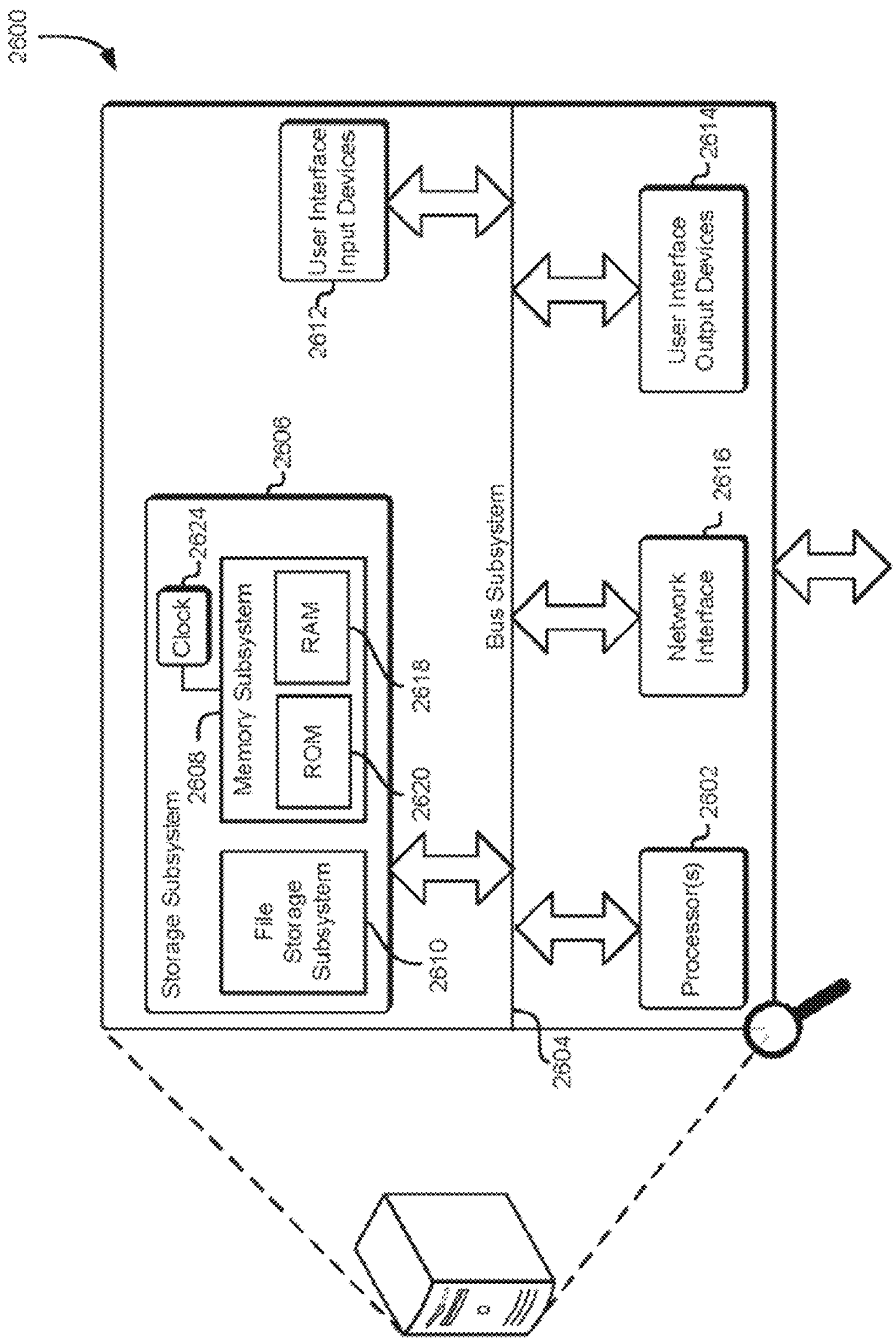
FIG. 7 is a schematic diagram illustrating a computing environment in which various embodiments can be implemented.

Methods are disclosed which verify the addition of two elliptic curve points within bitcoin script. Given two points $P_1$, $P_2$ and a candidate solution $P_3$ a method disclosed verifies in script that $P_3=P_1+P_2$. A further method is disclosed which extends the former method to a series of point additions.

The methods may be used in signature methods, such as multisignature methods, for a number of participants. The methods may use the Elliptic Curve Digital Signature Algorithm (ECDSA) protocol.

An elliptic curve of prime order p is defined by the equation:

$$y^2 = x^3 + ax + b.$$

According to the group structure of the curve, two points on the curve $P_1=(x_1, y_1)$ and $P_2=(x_2, y_2)$ may be added to get a third point $P_3=(x_3, y_3)$, i.e: $P_3=P_1+P_2$.

The point $P_3$ is defined as being the point on the elliptic curve that passes through the line connecting $P_1$ and $P_2$ that is then reflected about the x-axis. The formula for point addition is:

$$x_3 = \lambda^2 - x_1 - x_2 \bmod p$$
$$y_3 = \lambda(x_1 - x_3) - y_1 \bmod p,$$

where for the case $P_1 \neq P_2$ the gradient $\lambda$ is given by:

$$\lambda = \frac{y_2 - y_1}{x_2 - x_1} \bmod p$$

and for the case $P_1 = P_2$ the gradient $\lambda$ is given by:

$$\lambda = \frac{3x_1^2 + a}{2y_1} \bmod p.$$

The Bitcoin protocols, among others, use the secp256k1 conventions where the elliptic curve parameters are given by a=0 and b=7.

It is not practical to apply the extended Euclidean algorithm in the scripts of blockchain transactions as it requires the calculation of modular multiplicative inverses, and therefore it is not possible to implement elliptic curve point addition as defined in the above equations in the scripts.

Below, methods are disclosed that verify a solution of the addition of two points $P_1$ and $P_2$. The calculation of the solution $P_3=P_1+P_2$ itself is performed outside of script, while the answer is verified in script. This reduces the computational requirement that would otherwise be imposed on blockchain nodes.

To achieve this verification, the solution $P_3$ and the value of the gradient of the line between $P_1$ and $P_2$, denoted $\lambda$, are required. The calculation of $\lambda$ is performed outside of script but the verification of $\lambda$ can be performed in script.

New public key verification function <Point Add $P_1$, $P_2$, $\lambda$, $P_3$>, defined in greater detail below, is configured to return TRUE if $\lambda$ presented thereto is the gradient of the line between $P_1$ and $P_2$, and if $P_3=P_1+P_2$. These two verifications are achieved directly in script and, once the transaction is successfully redeemed, published.

Execution of the function comprises the following steps:

1. The value of $\lambda$ is verified by checking that:
   a) in the case $P_1 \neq P_2$ we have $$\lambda(x_2 - x_1) \bmod p = y_2 - y_1 \bmod p$$

b) in the case $P_1 = P_2$ we have $$2\lambda y_1 \bmod p = 3x_1^2 \bmod p.$$

2. The value of $P_3$ is validated by checking that the coordinates of $P_3=(x_3, y_3)$ satisfy equations:

$$x_3 = \lambda^2 - x_1 - x_2 \bmod p$$

and $$y_3 = \lambda(x_1 - x_3) - y_1 \bmod p.$$

By applying successive iterations of the public key verification function a summation of an arbitrary number n of public keys may be verified, with the only restriction being the requirements of the blockchain protocol being used, such as in Bitcoin script the number of op codes (201) or the size in bytes (10000).

The public key verification function above acts on three public keys to verify that two of the public keys combine to result in the third. This can be extended to verify the addition of three public keys $P=P_1+P_2+P_3$ and beyond. The extended function, denoted PointAddMulti, is defined below, where the verification procedure verifies that $P_1$, $P_2$, and $P_3$ combine to result in P:

$$<\text{Point Add Multi } P_1,P_2,P_3,\lambda',\lambda,P>:=<\text{Point Add } P_1,P_2,\lambda',P'><\text{Point Add } P',P_3,\lambda,P>$$

where $P'=P_1+P_2$, the value $\lambda'$ is the gradient between $P_1$ and $P_2$, and the value $\lambda$ is the gradient between P' and $P_3$.

In general terms, i.e. given n public keys $P_i$ which combine to result in public key P, PointAddMulti can be defined as follows:

$$<\text{PointAddMulti } P_i, \lambda_i, P> := <\text{PointAdd } P_1, P_2, \lambda_1, P_1'> <\text{PointAdd } P_1', P_3, \lambda_2, P_2'> \ldots <\text{PointAdd } P_{n-2}', P_n, \lambda_{n-1}, P>$$

The point addition function PointAdd can be constructed in bitcoin scripting language, using the method disclosed below.

The data encoding for an uncompressed public key is illustrated in FIG. 1. Here the dummy values for the data are taken from the well-known book Mastering Bitcoin by A. Antonopoulos, 2nd Edition, O'Reilly Media (2017).

Given an uncompressed public key P, the x and y coordinates can be extracted directly in bitcoin script using the operator OP_SPLIT as follows:

$$<P>OP\_1OP\_SPLIT\ OP\_NIP32OP\_SPLIT=<x><y>.$$

Using this operation the x and y coordinates can be extracted from the inputs $P_3$, $\lambda$, $P_1$, $P_2$:

$$\langle P_3\rangle\langle\lambda\rangle\langle P_1\rangle\langle P_2\rangle \longrightarrow \langle x_3\rangle\langle y_3\rangle\langle\lambda\rangle\langle x_1\rangle\langle y_1\rangle\langle x_2\rangle\langle y_2\rangle$$

It should be noted that the terms on the right hand side of the above can be duplicated and rearranged to produce any desired combination using elementary operations.

Referring to FIG. 2, the first step in the construction of the function PointAdd is to verify the input value of $\lambda$. In the case where $P_1 \neq P_2$, it is checked that the following equation holds true: $\lambda(x_2-x_1) \bmod p=y_2-y_1 \bmod p$. This is achieved by taking as input $<y_2>$ $<y_1>$ $<\lambda>$ $<x_2>$ $<x_1>$ and acting on this input with the following operations:

$$OP\_SUB\ OP\_MUL<p>OP\_MOD\ OP\_3OP\_ROLL\ OP\_3OP\_SUB<p>OP\_MOD\ OP\_EQUAL$$

This will return TRUE if and only if the equation $\lambda(x_2-x_1) \bmod p=y_2-y_1 \bmod p$ is satisfied. The table of FIG. 2 illustrates the evolution of the stack as the above operations are carried out.

For the case $P_1=P_2$a similar set of operations to those described above can be constructed that check that the following equation holds true:

$$2\lambda y_1 \bmod p = 3x_1^2 \bmod p$$

Referring to FIG. 3, the second step in the construction of the function PointAdd is to verify that the input value of $P_3$ is the sum of $P_1+P_2$. To do this, it is checked that each of the following equations hold true:

$$x_3 = \lambda^2 - x_1 - x_2 \bmod p,$$

and $$y_3 = \lambda(x_1 - x_3) - y_1 \bmod p,$$

Since λ has already been verified, it may be used in the following calculations. To check that the first of the above two equations holds, the following is presented as input:

$$<x_3><\lambda><x_1><x_2>$$

and is acted on with the following operations:

```
OP_3OP_ROLL OP_DUP OP_MUL OP_SWAP
    OP_SUB OP_SWAP<p>OP_MOD
    OP_EQUAL.
```

Here, p is the order of the elliptic curve base field.

The table of FIG. 3 illustrates the evolution of the stack as the above operations are carried out.

A new public key $P_3$ can be created by adding an existing public key $P_1$ to a public key that is calculated from the elliptic curve generator point G multiplied by a number $S\in \mathbb{Z}_n^*$; such that:

$$P_3 = P_1 + S \cdot G.$$

S may be a deterministic key used to create a derived public key $P_3$ from an original public key $P_1$.

The verification of point additions of the form $P_3=P_1+S{\sim}G$ can be achieved by verifying a sequence of point additions involving fixed multiples of the generator point G.

As an example, double-and-add method may be used to decompose the point addition into the series:

$$P_3 = P_1 + s_0 G + s_1 2G + s_2 4G + s_3 8G + \ldots + s_{256} 2^{256} G$$

where $s_0, \ldots, S_{256}\in\{0,1\}$ are the coefficients in the binary expansion of S as follows:

$$S = s_0 + s_1 2 + s_2 4 + s_3 8 + \ldots + s_{256} 2^{256}.$$

The points obtained by doubling the generator G, 2G, 4G, . . . , $2^{256}$ G are common knowledge and can be calculated in advance. This means that there are a possible 255 individual point additions that need to be verified to obtain the final result.

Thus $P_3=P_1+S$. G may be verified with a maximum of 255+1=256 point additions.

Alternatively to the double-and-add method, other point-addition methods algorithms such as the sliding-window or Montgomery ladder methods may be used.

In order to make the computation of the point addition with calculated keys more manageable S may be restricted to a smaller range. The range may be application specific.

S may be required to take values in a 32 bit range within $\mathbb{Z}_n^*$, which represents a 4.3 billion range of values. However, only 31 individual point additions are required to verify the final result. This may be achieved, in Bitcoin as an example, by starting with an S in the full 256-bit range and then applying the modular operation OP_MOD to restrict the range to 32 bits. A random public key $P_x$ may be used to obscure the range by taking the sum $P_x+S\cdot G$.

As an example, a used car auction may have a maximum bid of 16,000 USD. A bid of t USD in the form of the number 16000 can be added to a public key $P_1$ to get the additive key:

$$P = P_1 + t \cdot G,$$

which may be verified with 14 point additions in script.

To see how this could be used in the bidding process, suppose the current highest bid on a car is 9,000 USD which is being tracked by a particular UTXO. This UXTO has the redeem script:

```
IF t > 9000
  <Point Add Multi P1, t · G, P>
  <CheckSig P>
ELSE
  OP_RETURN
```

Which requires as input for unlocking:

```
<Sig P><P><Verification data><P1><t>
```

The point addition verification method, described above, can then be used to verify that $P=P_1+t\cdot G$. Note that this involves the verification of 14 individual point additions. The data for these verifications are labelled 'verification data' in the input above.

The UTXO can be unlocked if a new bid of t>9000 is provided. The new bidder must provide their public key $P_1$ and the solution P to the sum $P=P_1+t\cdot G$. The fact that they sign the transaction with the additive key P invariably links them to the particular bid of t USD.

As another example, consider a bitcoin miner who searches for a nonce (a number) that, when hashed with a block in a blockchain, such as the current block, produces a value below a certain threshold. The miner may create a transaction that is locked with their public key plus the first 9 digits of the nonce $P=P_1+$ (first 9 digits of nonce)·G. There are a billion combinations for the first 9 digits of a number. Therefore, the public key P can be verified using 30 point additions. This invariably links the key P with the miner's public key and the nonce of the mined block.

The inscript point addition verification procedure described above may be used to implement an efficient way of signing a transaction using an M-of-N multisignature method, thereby enabling a more efficient and secure method for transferring control of, or access to, a resource using a blockchain.

For an M-of-N method, the Bitcoin op code OP_MULTISIG takes as input N public keys and M signatures. The OP code starts with the first signature and searches the N public keys testing to see if the signature was created by that public key. It drops every key for which the signature does not match. For this reason, the order of the signatures must match the order with which the public keys are provided.

A multisig redeem script looks like:

```
<PubKey 1><PubKey 2> . . . <PubKey
    N>OP_CHECKMULTISIG
```

Which requires as input for unlocking:

<Sig 1><Sig 2> . . . <Sig *M*>.

It can be seen from the above that the script size scales linearly with both the number of required signatures M and the number of participants N.

Referring to FIGS. 4 to 6, a Merkle tree with leaves corresponding to each M-of-N combination of public keys is created, which contains a total of N choose M leaves. Next, a redeem script is created which contains the Merkle root, and requires for unlocking presentation of an input containing the Merkle path and a signature verification method.

Two method for transferring control of, or access to, a resource are described below. Each has their own advantages and disadvantages.

1. Individual signature method. This uses each signature to sign the transaction individually, and has the same functionality as multisig but lower script size.
2. Group signature method. This provides a single signature for the M participants in the signing group. This may be any public key agreed in advance for each collection M of participants, such as a key derived from a shared secret, or a key formed by summing the public keys of the group. In the latter case, an additional option for verifying that the key is the sum of the individual members' keys uses the verification method described earlier.

Each method has different scaling properties, as summarised in the table laid out in FIG. 4. Consider a 4-of-5 method. In this case, the Merkle tree will have 5 choose $$4 = \binom{5}{4} = \frac{5!}{4!(5-4)!} = 5 \text{ leaves.}$$

The Merkle tree itself will be three levels deep. The operation for verifying a Merkle path with root <R> is:

<Verify Merkle Path>=6*OP*_PICK *OP*_SHA256(*OP*_SWAP *OP*_IF *OP*_SWAP *OP*_ENDIF *OP*_CAT *OP*_SHA256)* 3<*R*>*OP*_EQUALVERIFY which will return TRUE for a Merkle path of the form <Leaf><Grandparent Sib><0,1><Parent Sib><0, 1><Sib><0,1> where there is a 0 if a sibling is a left node and a 1 if the sibling is a right node.

The Merkle path and operation to verify the Merkle path grow in size logarithmically with the number of choices of signing groups N choose M.

In the Individual Signatures method, each member of the group provides an individual signature of the transaction. The functionality of this method is identical to the standard multisig method;

however the size of the script is reduced which increases the efficiency with which the script is executed. The script takes the following form:

<Verify Merkle Path><CheckSig>**M*

Which requires for unlocking presentation of the following input:

<Sig $P_1$> . . . <Sig $P_M$><$P_1$> . . . <$P_M$><Merkle Path $P_1$, . . . ,$P_M$>

The redeemer must provide as input the M signatures with their corresponding public keys, and the Merkle path of P.

The mapping of $P_1$, . . . , $P_M$ to the Merkle tree leaf in this method could be, for example, the hash of concatenation of $P_1$, . . . , $P_M$ using OP_CAT.

The key feature of this method is that each member signs a specific transaction. They do not reveal any information about their private keys with one another and thus do not compromise the security of their private keys.

Referring to FIG. 4, it can be seen that this method has advantageous scaling properties over the traditional multisig method. This is most pronounced when the multisignature regime lies in low-M and large-N, for example 5-of-1000.

In the Group Signatures method, only one signature is required for a group of M members that sign a transaction. The script takes the following form:

<Verify Merkle Path><CheckSig>

Which requires for unlocking presentation of the following input:

<Sig *P*><*P*><Merkle Path>

Here, P is a group public key for the collection of M participants.

The advantages of this method are that the unlocking script size is very small, as it requires only one signature. The number of inscript public key additions scales linearly with the number of participants M so this method provides a less costly operation in terms of processing power than checking individual signatures.

This method requires the participants to share with one another their private keys. This means that it would be useful for the keypairs they use in this method to be one-time use keypairs to improve security of the method. Another feature is that any member of the participants that has access to the group private key may sign any transaction they wish. This increases the versatility of the method. There are applications where these features are particularly desirable. For example, a group of directors wishing to activate a well-established last-resort clause that has been recorded on a blockchain as a UTXO. This may be activated by unlocking that particular UTXO using this method.

In the above method an outside observer would be completely unaware that this is, in fact, a group signature method. To make public the fact that the signature and corresponding public key relate to a group of users, the method may be modified to require that the group public key be verified to be the sum of the public keys of the individual participants $P=P_1+ \ldots +P_M$ in script. This adapted method may use the key addition verification method described above.

In such an adapted method, the redeem script may take the following form:

<Verify Merkle Path><Point Add Multi $P_1$, . . . ,$P_M$, *P*><CheckSig>

Which requires for unlocking presentation of the following input:

<Sig *P*><*P*><Verification data><*P*><$P_1$> . . . <$P_M$><Merkle Path>

Where the <Point Add Multi $P_1$, . . . , $P_M$, P> function is that which was introduced earlier, and <Verification data> contains the gradients between each individual point addition.

FIG. 5 illustrates a pair of transactions Tx1 and Tx2. Tx1 defines a UTXO having a redeem script containing the Verify Merkle Path function, the PointAddMulti function tailored to particular M-of-N requirements, and the CheckSig function. Tx2 defines a transaction subsequently submitted to the blockchain intended to redeem the UTXO of Tx1 by presenting thereto in an input the group signature, the group public key related to the group signature, the gradients required by the PointAddMulti function, the public keys of the group of users, and the associated Merkle Path.

FIG. 6 shows a flow chart which illustrates the steps taken to execute the method in accordance with the Individual Signatures method and the Group Signatures method described above. In FIGS. 6, Tx1 and Tx2 may refer to a pair of transactions used in accordance with either method.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

It should be noted that the above-mentioned embodiments illustrate rather than limit the invention, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method, comprising operations, the operations comprising:
   - obtaining a first blockchain transaction configured to be redeemable to permit access to or transfer control of, a resource, wherein the first blockchain transaction has an output comprising a public key combination verification function, wherein said function comprises:
     - a plurality of public keys including a first public key and a second public key, each public key being a point on an elliptic curve, and
     - a group public key being the elliptic curve point addition of the first and second public keys;
   - determining a first gradient value being the gradient of the line between the first and second public keys;
   - providing a second blockchain transaction comprising an input comprising said public keys, said first gradient value, and said group public key; and
   - submitting the second blockchain transaction to a blockchain;
   - wherein the first blockchain transaction is configured to be redeemable to permit access to, or transfer control of, a resource on successful application of the public key combination verification function to the input to verify that the group public key is derived from a combination of the public keys.

2. A method according to claim 1, wherein:
   - the input of the second blockchain transaction further comprises:
     - a first number of further public keys of the plurality of public keys, the first, second and further public keys being in an ordered list, and
     - the first number of further gradient values, each corresponding to a further public key, and each being the gradient of the line between the elliptic curve point addition of the public keys previous to the corresponding public key, and the corresponding public key; and
   - the group public key is the elliptic curve point addition of the first, second and further public keys.

3. A method according to claim 2, wherein a successful application of the public key combination verification function comprises:
   - (i) applying the function to the first and second public keys and the first gradient value to obtain a first result;
   - (ii) applying the function to the first result and the next further public key and the corresponding gradient value; and
   - (iii) repeating step (ii) for all the further public keys.

4. A method according to claim 1, wherein the output of the first blockchain transaction further comprises:
   - a group signature corresponding to the group public key,
   - a Merkle root, and
   - a Merkle path verification function.

5. A method according to claim 4, wherein the input of the second blockchain transaction comprises:
   - a Merkle path associated with the plurality of public keys, and
   - a group private key corresponding to the group signature.

6. A method according to claim 1, wherein the output of the first blockchain transaction further comprises:
   - a plurality of signatures corresponding to the plurality of public keys,
   - a Merkle root, and
   - a Merkle path verification function.

7. A method according to claim 6, wherein the input of the second blockchain transaction comprises:
   - a Merkle path associated with the plurality of public keys, and
   - a plurality of private keys corresponding to the plurality of signatures.

8. A system, comprising: a processor; and memory including executable instructions that, as a result of execution by the processor, causes the system to:
   - obtain a first blockchain transaction configured to be redeemable to permit access to, or transfer control of, a resource, wherein the first blockchain transaction has an output comprising a public key combination verification function, wherein said function comprises:
     - a plurality of public keys including a first public key and a second public key, each public key being a point on an elliptic curve, and
     - a group public key being the elliptic curve point addition of the first and second public keys;
   - determine a first gradient value being the gradient of the line between the first and second public keys;
   - provide a second blockchain transaction comprising an input comprising said public keys, said first gradient value, and said group public key; and
   - submit the second blockchain transaction to a blockchain;
   - wherein the first blockchain transaction is configured to be redeemable to permit access to, or transfer control of, a resource on successful application of the public key combination verification function to the input to verify that the group public key is derived from a combination of the public keys.

9. A system according to claim 8, wherein:
   - the input of the second blockchain transaction further comprises:
     - a first number of further public keys of the plurality of public keys, the first, second and further public keys being in an ordered list, and
     - the first number of further gradient values, each corresponding to a further public key, and each being the gradient of the line between the elliptic curve point addition of the public keys previous to the corresponding public key, and the corresponding public key; and
   - the group public key is the elliptic curve point addition of the first, second and further public keys.

10. A system according to claim 9, wherein a successful application of the public key combination verification function comprises:
   - (i) applying the function to the first and second public keys and the first gradient value to obtain a first result;
   - (ii) applying the function to the first result and the next further public key and the corresponding gradient value; and
   - (iii) repeating step (ii) for all the further public keys.

11. A system according to claim 8, wherein the output of the first blockchain transaction further comprises:
   - a group signature corresponding to the group public key,
   - a Merkle root, and
   - a Merkle path verification function.

12. A system according to claim 11, wherein the input of the second blockchain transaction comprises:

a Merkle path associated with the plurality of public keys, and a group private key corresponding to the group signature.

13. A system according to claim 8, wherein the output of the first blockchain transaction further comprises:

a plurality of signatures corresponding to the plurality of public keys, a Merkle root, and a Merkle path verification function.

14. A system according to claim 12, wherein the input of the second blockchain transaction comprises:

a Merkle path associated with the plurality of public keys, and a plurality of private keys corresponding to the plurality of signatures.

15. A non-transitory computer-readable storage medium having stored thereon executable instructions that, as a result of being executed by a processor of a computer system, cause the computer system to obtain a first blockchain transaction configured to be redeemable to permit access to, or transfer control of, a resource, wherein the first blockchain transaction has an output comprising a public key combination verification function, wherein said function comprises:

a plurality of public keys including a first public key and a second public key, each public key being a point on an elliptic curve, and a group public key being the elliptic curve point addition of the first and second public keys;

determine a first gradient value being the gradient of the line between the first and second public keys;

provide a second blockchain transaction comprising an input comprising said public keys, said first gradient value, and said group public key; and submit the second blockchain transaction to a blockchain;

wherein the first blockchain transaction is configured to be redeemable to permit access to, or transfer control of, a resource on successful application of the public key combination verification function to the input to verify that the group public key is derived from a combination of the public keys.

16. A non-transitory computer-readable storage medium according to claim 15, wherein:

the input of the second blockchain transaction further comprises:

a first number of further public keys of the plurality of public keys, the first, second and further public keys being in an ordered list, and the first number of further gradient values, each corresponding to a further public key, and each being the gradient of the line between the elliptic curve point addition of the public keys previous to the corresponding public key, and the corresponding public key; and the group public key is the elliptic curve point addition of the first, second and further public keys.

17. A non-transitory computer-readable storage medium according to claim 16, wherein a successful application of the public key combination verification function comprises:

(i) applying the function to the first and second public keys and the first gradient value to obtain a first result;

(ii) applying the function to the first result and the next further public key and the corresponding gradient value; and (iii) repeating step (ii) for all the further public keys.

18. A non-transitory computer-readable storage medium according to claim 15, wherein the output of the first blockchain transaction further comprises:

a group signature corresponding to the group public key, a Merkle root, and a Merkle path verification function.

19. A non-transitory computer-readable storage medium according to claim 18, wherein the input of the second blockchain transaction comprises:

a Merkle path associated with the plurality of public keys, and a group private key corresponding to the group signature.

20. A non-transitory computer-readable storage medium according to claim 15, wherein the output of the first blockchain transaction further comprises:

a plurality of signatures corresponding to the plurality of public keys, a Merkle root, and a Merkle path verification function; and the input of the second blockchain transaction comprises:

a Merkle path associated with the plurality of public keys, and a plurality of private keys corresponding to the plurality of signatures.

* * * * *